United States Patent [19]
Heron

[11] Patent Number: 6,055,478
[45] Date of Patent: Apr. 25, 2000

[54] INTEGRATED VEHICLE NAVIGATION, COMMUNICATIONS AND ENTERTAINMENT SYSTEM

[75] Inventor: Craig Heron, North York, Canada

[73] Assignees: Sony Corporation, Tokyo, Japan; Sony Electronics Inc., Park Ridge, N.J.

[21] Appl. No.: 08/961,299

[22] Filed: Oct. 30, 1997

[51] Int. Cl.[7] .............................. G01C 21/00; G06G 7/78
[52] U.S. Cl. ...................... 701/213; 701/200; 701/208; 340/990; 340/995; 345/1
[58] Field of Search .................... 701/200, 208, 701/213, 216, 217; 340/988, 990, 995; 345/1, 133, 141

[56] References Cited

U.S. PATENT DOCUMENTS

| | | | |
|---|---|---|---|
| 4,689,626 | 8/1987 | Hori et al. ............................... | 342/357 |
| 5,228,074 | 7/1993 | Mizikovsky .............................. | 379/59 |
| 5,257,254 | 10/1993 | Kutaragi .................................... | 369/50 |
| 5,319,487 | 6/1994 | Sato et al. ............................... | 359/142 |
| 5,365,449 | 11/1994 | Kashiwazaki ........................... | 701/208 |
| 5,398,188 | 3/1995 | Maruyama ............................... | 701/208 |
| 5,493,498 | 2/1996 | Miyoshi .................................. | 701/208 |
| 5,515,284 | 5/1996 | Abe ........................................ | 701/200 |
| 5,740,049 | 4/1998 | Kaise ...................................... | 701/208 |
| 5,774,070 | 6/1998 | Rendon ................................... | 701/208 |
| 5,826,212 | 10/1998 | Nagai ..................................... | 701/208 |

FOREIGN PATENT DOCUMENTS

| | | |
|---|---|---|
| 4-252551 | 9/1992 | Japan . |
| 5-31419 | 4/1993 | Japan . |
| 5-76146 | 10/1993 | Japan . |
| 6-29243 | 4/1994 | Japan . |
| 7-29949 | 6/1995 | Japan . |

OTHER PUBLICATIONS

Garmin Corporation, The trouble with ordinary maps is, they don't know where you are—this is no ordinary map., Magazine Advertisement, 1997.

Sony Brochure, Information Navi System, Product Information Sales Brochure, Nov. 1997.

Etak, Inc., Introducing SKY–MAP Pro. It's the Difference Between Getting Lost and Getting There, American Way Magazine Advertisement, Mar. 1, 1998.

White, et al., Computer Industry Races to Conquer the Automobile, The Wall Street Journal, Feb. 23, 1998.

*Primary Examiner*—William A. Cuchlinski, Jr.
*Assistant Examiner*—Gertrude Arthur
*Attorney, Agent, or Firm*—Wood, Herron & Evans, L.L.P.

[57] ABSTRACT

An integrated vehicle navigation, communication and entertainment system which also has vehicle security features. A dash-mounted unit includes a global positioning system receiver for receiving radio frequency signals and generating therefrom a vehicle position, a screen for displaying navigational or other information to a vehicle occupant, a digital data media player for reading position-related navigational information from a removable digital data media such as a compact disc, DVD, mini-disc, or removable hard disk drive, and for audio playback from conventional audio disks. The system controller obtains a position generated by the global positioning system receiver, obtains position-related navigation information from the digital data medium which is related to the vehicle position generated by the global positioning system receiver, and delivers the navigational information to the screen for display. A handheld unit operates as a remote control for controlling the dash unit to perform various navigational functions, and further serves as a fully portable wireless telephone. Security features are also provided.

109 Claims, 2 Drawing Sheets

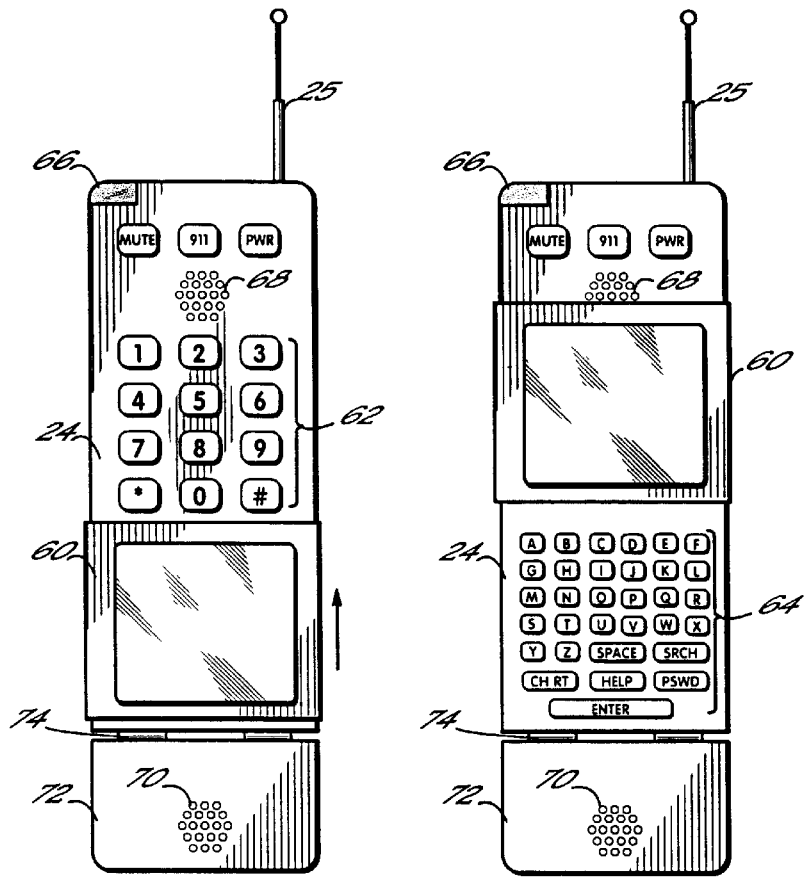
FIG. 3A   FIG. 3B
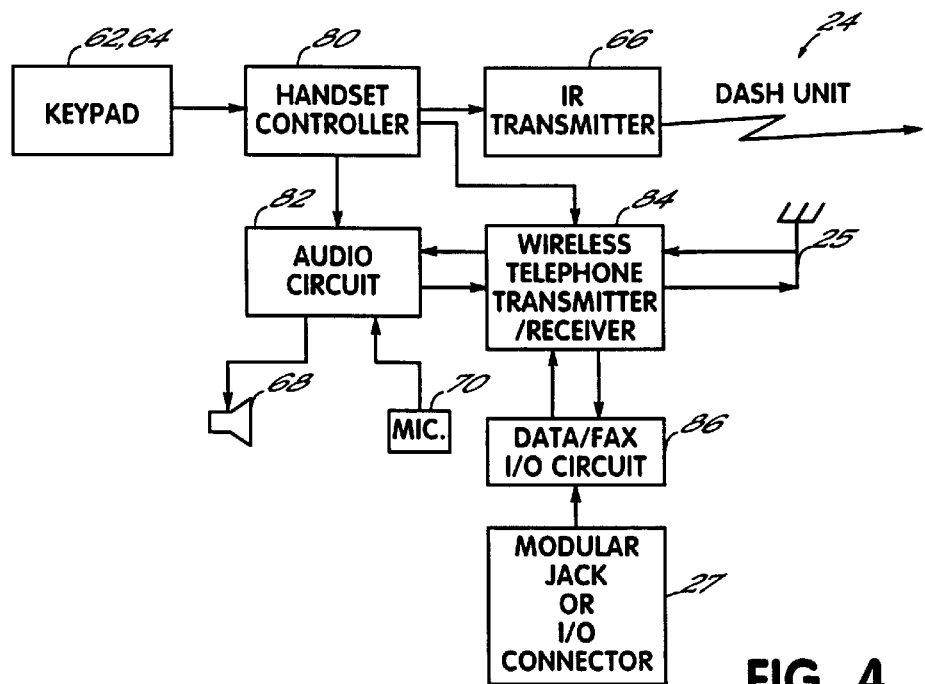
FIG. 4

6,055,478

INTEGRATED VEHICLE NAVIGATION, COMMUNICATIONS AND ENTERTAINMENT SYSTEM

FIELD OF THE INVENTION

The present invention relates to vehicle electronics used for navigation, communication and entertainment.

BACKGROUND OF THE INVENTION

In recent years, vehicle electronics have reached a level of substantial sophistication. In the past a vehicle's electronic system typically included only an entertainment system, having for example an AM or AM/FM radio tuner, connected to a single monophonic speaker, so that the driver could listen to the radio while driving. Entertainment systems of this kind have become increasingly complex, and now include, in addition to AM and AM/FM tuner, players for pre-programmed audio such as on audio tape, compact disc, or digital audio tape. In some instances, video tape or video disc players are also included in a vehicle entertainment system for entertainment of passengers. Stereophonic or quadraphonic speakers are included in many vehicles to enhance the fidelity and realism of audio reproduction, and in some cases, subwoofers are also included to provide high quality low frequency sound reproduction. To facilitate use and control of the entertainment system by all passengers, wireless remote control systems, typically transmitting infrared signals, have also been included in vehicle entertainment systems.

Vehicle electronics have also expanded to incorporate communications systems, particularly cellular telephones. As cellular telephone systems became publicly available, vehicles were outfitted with cellular radio transmitters/receivers, and integrated telephone handsets or speakerphones, to allow the driver and/or passengers to speak with other parties over telephone connections while driving or riding in the vehicle. As fully portable handheld cellular telephones became available, automobiles were outfitted with cellular signal repeaters to enhance the range of handheld cellular telephones when used inside of the vehicle. Furthermore, as telephone-based facsimile and data communications systems became generally available, in some cases computers or facsimile machines were connected with cellular telephones to permit facsimile or data communications to and from vehicles.

Most recently, vehicle electronics have begun to incorporate navigation systems. Typical vehicle navigation systems include a global positioning system, having a receiver for collecting satellite signals to pinpoint the position of the vehicle, and a database of maps or other information that can be combined with the current vehicle position to aid the driver in navigation of the vehicle.

Unfortunately, with the proliferation of these vehicle electronic systems, it has become increasingly difficult to outfit a vehicle with a state-of-the art electronics, without excessive clutter and expense. Furthermore, the navigation, communication and entertainment systems that can be purchased each lack all of the functionality which might be desired for optimal use in a vehicle environment.

SUMMARY OF THE INVENTION

These difficulties and limitations are overcome in accordance with principles of the present invention. Specifically, the present invention provides an integrated vehicle navigation, communication and entertainment system, which enhances the functionality and improves the ease of use of navigation, communication and entertainment electronics known in the prior art.

Specifically, in one aspect, the invention features an electronic circuit for a vehicle comprising a global positioning system receiver for receiving radio frequency signals and generating therefrom a vehicle position, a screen for displaying information to a vehicle occupant, a digital data media player for reading position-related navigational information from a removable digital data media such as a compact disc, DVD, mini-disc, or removable hard disk drive, and a system controller for obtaining a position generated by the global positioning system receiver, obtaining position-related navigation information from the digital data medium which is related to the vehicle position generated by the global positioning system receiver, and delivering the navigational information to the screen for display.

In specific embodiments, the position-related navigational information includes maps of streets and landmarks near to a position, tourist information related to a particular position, and safety and security information related to a particular position.

The system controller may also be responsive to alphabetic input from an alphabetic keypad, to search and locate position-related navigational information from the digital data media based on text input by a vehicle occupant. The system controller can also be capable of plotting routes along streets and roads identified in the digital data media, to a location identified by a vehicle occupant via the alphabetic keypad.

The system controller can also further include a security function, which requires a password or code to permit continued operation of the system, and a second display used to display status information regarding the operation of the system controller.

For integration with an existing vehicle entertainment system, the system can also include an amplifier delivering an amplified analog signal to one or more vehicle speakers, and a digital to analog converter converting digitally-encoded audio information into an analog signal and delivering the analog signal to the amplifier for output as an audible signal by the speaker. The amplifier and digital to analog converter may be configured to drive a single speaker or multiple speakers arranged in a stereophonic, quadraphonic or other speaker matrix arrangement.

In this integrated system, the digital data media player can be capable of reading conventional music/audio compact discs, DVD's and/or mini-discs as well as compact disc read-only memories, and the system controller configured to deliver the audio from such media to the amplifier for output to the speaker(s), so that the system can be used to listen to pre-programmed music as well as audio accompanying navigational information.

In another aspect, the system includes a dashboard unit having a global positioning system receiver, and a handset incorporating a remote control circuit for controlling operation of the system controller, where the handset can further be used as a telephone for transmitting and receiving wireless radio telephone communications.

In an alternative aspect, the system includes a dashboard unit with a digital data media player and a system controller for interacting with the digital data media player to deliver digital information for output to an occupant of the vehicle, and a handset incorporating a remote control circuit for controlling operation of the system controller, where the handset can further be used as a telephone for transmitting and receiving wireless radio telephone communications.

In specific embodiments of these alternative aspects, the handset generates, for example, infrared signals, and the system controller receives these infrared signals for controlling operations of the system controller. Alternatively, the handset has a wired connection to the system controller.

In one embodiment, a keyboard on the handset includes a numeric keypad for controlling wireless radio telephone communications, and an alphabetic keypad for entering alphabetic characters to control the system controller, for example to deliver characters to the system controller to cause the system controller to search and locate position-related navigational information from a digital data media and or control operations of the global positioning system receiver.

In the main embodiment described below, the handset includes a wireless telephone transmitter/receiver. In this embodiment, the system controller can include a telephone signal repeater for receiving and amplifying radio frequency signals generated by the handset. Alternatively, where the handset has a wired connection to the system controller, the system controller may itself contain a wireless telephone transmitter/receiver.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIGS. 3A and 3B are illustrations of the handset shown in FIG. 1, configured for entry of numeric and alphabetic information, respectively.

FIG. 4 is a block diagram of the main function elements of the handset shown in FIGS. 3A and 3B.

DETAILED DESCRIPTION OF SPECIFIC EMBODIMENTS

Figure 1:
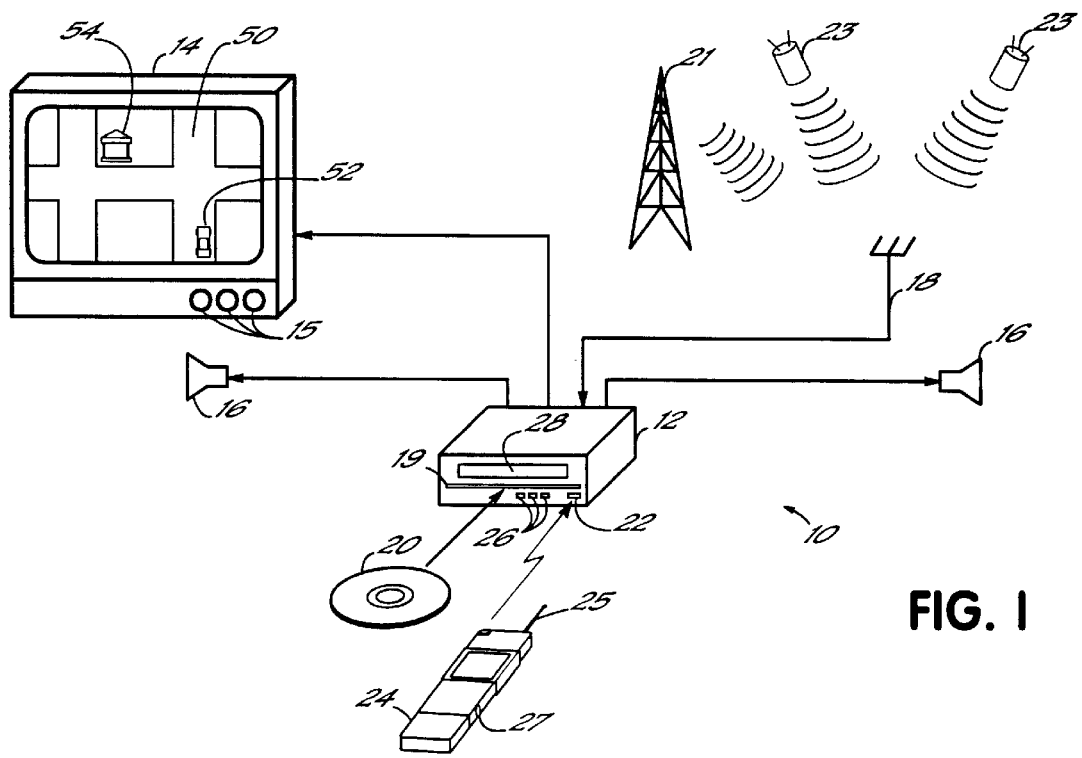
FIG. 1 is a overall view of an integrated vehicle electronic system in accordance with principles of the present invention.

Referring to FIG. 1, an integrated vehicle electronics system 10 in accordance with principles of the present invention includes a dash unit 12, a display screen 14, speakers 16, an antenna 18 and a handset 24. Antenna 18 (which may be a composite or diversity antenna) receives signals from terrestrial AM/FM radio broadcast towers 21 as well as global positioning satellites 23.

Dash unit 12 is configured for installation in the dashboard of a vehicle, in a manner conventional for car stereo systems. Dash unit 12 includes a slot 19 sized to receive a CD 20. Inside of dash unit 12 is a CD/CD-ROM player capable of reading conventional music/audio CD's containing music or audio, or CD-ROM's, such as CD-ROM's containing navigational information for use in aiding occupants of the vehicle in navigation.

The exposed front face of dash unit 12 further includes an infrared signal receiver 22, for receiving an infrared remote control signal from a handset 24. Handset 24 includes a keypad used by a vehicle occupant to cause handset 24 to generate wireless remote control signals, which are transmitted to infrared signal receiver 22 to control the operations of dash unit 12. The front face of dash unit 12 further includes one or more keys 26 forming a keypad, for use by a vehicle occupant to directly enter control signals to dash unit 12.

The front face of dash unit 12 also includes a display screen 28, for example a light emitting diode display, for displaying simplified status and/or navigational information relating to the functions being performed by dash unit 12.

Status and/or navigational information is also delivered to vehicle occupants via a display screen 14. Display screen 14 is, for example, a backlit liquid crystal diode screen such as is used in notebook computers and/or personal digital assistants. A keypad 15 on the housing of display screen 14 can be used, for example, to turn display screen 14 on and off and to adjust the contrast and backlight intensity.

Handset 24 not only serves as a remote control for dash unit 12, but further is a wireless telephone. Handset 24 has an antenna 25 used to send and receive wireless telephone signals. e.g., via cellular or PCS wireless telephone services. Handset 24 can be used to transmit voice signals over telephone lines, or alternatively can transmit and receive facsimile and/or data signals received by handset 24 via modular telephone jack 27 from a computer or facsimile machine. Where handset 24 is equipped for operation in a PCS digital wireless telephone service, telephone jack 27 may be a digital input/output (I/O) connector for direct connection, e.g. to the serial port of a computer.

Figure 2:
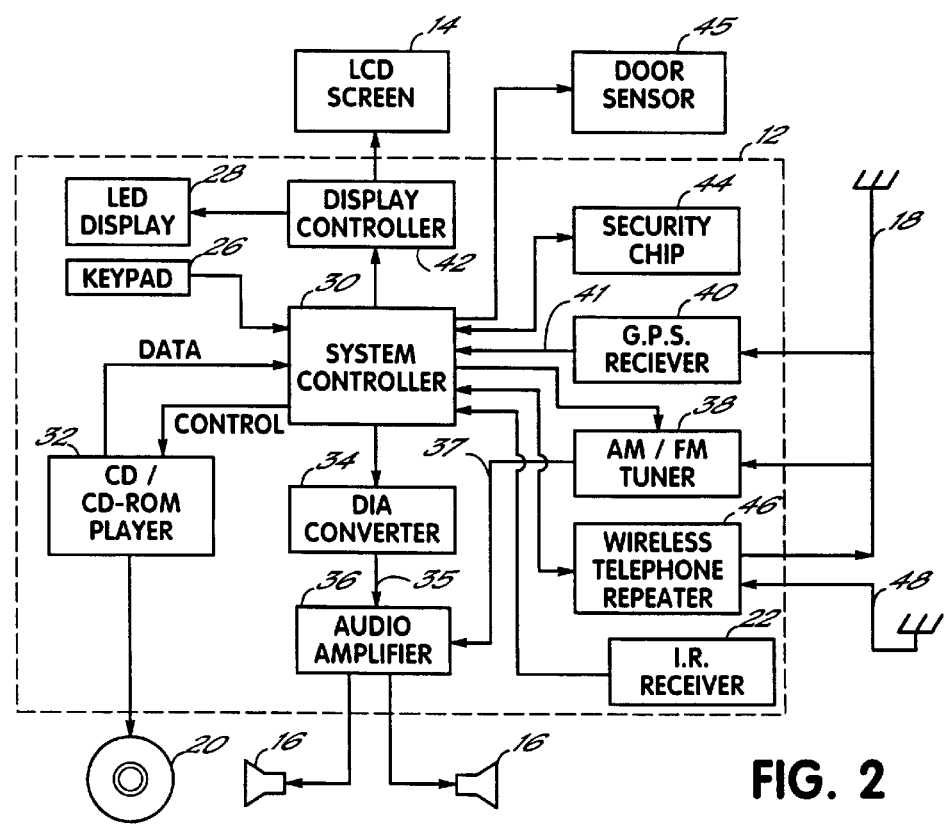
FIG. 2 is a block diagram of the main functional elements of the dash unit shown in FIG. 1.

Referring now to FIG. 2, the electric circuit components of dash unit 12 can be more fully understood. At the heart of dash unit 12 is a system controller 30, which may be a microprocessor or microcontroller, for example formed from an application specific integrated circuit (ASIC). System controller 30 is connected to keypad 26 to receive commands entered by keystrokes on keypad 26, and is also connected to display screens 14 and 28 to display status and/or navigational information to the vehicle occupants. System controller 30 is also connected to infrared signal receiver 22 for receiving infrared signals indicative of vehicle occupant commands entered via the keypad on handset 24.

System controller 30 interacts with a CD/CD-ROM player 32 to read data from compact discs inserted into dash unit 12 via slot 19, to perform the various functions of dash unit 12 described below. CD/CD-ROM player may, for example, incorporate the circuitry and functions described in U.S. Pat. No. 5,257,254, assigned to the same assignee as the present application, and incorporated herein in its entirety.

Dash unit 12 further includes a digital to analog converter 34 connected to system controller 30, for converting digital signals (e.g., obtained from digitized audio on a conventional audio compact disc 20 in player 32, or encoded with other information on a CD-ROM disc 20 containing navigational information) into analog signals on line 35. The analog signals output on line 35 are coupled to an audio amplifier 36, which amplifies analog signals to drive speakers 16. Audio amplifier 36 is also connected, via line 37, to an AM/FM tuner 38, which tunes amplitude modulated (AM) and/or frequency modulated (FM) radio broadcasts received by antenna 18, and produces analog audio signals on line 37 for output to speakers 16. AM/FM tuner 38 is controlled by system controller 30 to, for example, select a tuning frequency.

Dash unit 12 further includes a global positioning system (GPS) receiver 40 for receiving, global positioning radio signals, e.g. from global positioning satellites, and generating therefrom a vehicle position. GPS receiver 40 may, for example, incorporate the circuitry and functions described in U.S. Pat. No. 4,689,626, assigned to the same assignee as the present application, and incorporated herein in its entirety. The position signal generated by GPS receiver 40 is delivered to system controller 30 over line 41.

Dash unit 12 further includes a display controller 42 for controlling the display of information by dash unit 12. Specifically, display controller 42 receives control signals from system controller 30 and controls the output of information on the LCD display screen 14 and the second LED display screen 28 on the exposed front face of the dash unit 12.

Dash unit 12 also includes a security chip 44 having non-volatile memory for storing a password or other security code, and a door sensor input for connection to door sensors 45. System controller 30 accesses security chip 44 during operation of dash unit 12, e.g., when a door is opened indicating entry to the vehicle, or upon application of ignition switch power indicating that the vehicle has been started, to obtain the password or security code. The vehicle operator is then required to enter the same password or security code using keypad 26 or the remote handset 24, before any other operations of dash unit 12 can be activated. This reduces the likelihood of theft of the dash unit 12 as the dash unit 12 cannot be operated without the password or security code. The security chip 44 can be a read only memory, in which case the password or security code is factory-set, or security chip 44 can be a non-volatile (e.g., battery backed-up) RAM or electrically erasable programmable read only memory EEPROM, in which case the vehicle operator, after entering the correct security password or code, can be given the opportunity to change the password or code and write the new password or code into security chip 44.

Dash unit 12 also includes a wireless telephone signal repeater 46, which relays wireless telephone signals received via an antenna 48 internal to the vehicle (which may be incorporated inside the housing of dash unit 12, to antenna 18 which is mounted externally to the vehicle, and vice-versa. Repeater 46, which may be an active or passive circuit, thus enhances the signal range of the wireless telephone signals generated and received by handset 24 when handset 24 is being used as a wireless telephone. Repeater 46 is also coupled to system controller 30 to allow system controller 30 to control and monitor operations of repeater 46 and to originate transmissions of various kinds using repeater 46. For example, if the correct password or code is not entered into handset 24 within a predetermined period of time, dash unit 12 generates a silent alarm which can be detected by the police, e.g., using wireless telephone networks, so that any attempted theft of the vehicle containing dash unit 12 which is detected can be brought to the attention of the authorities. In a further alternative, dash unit 12 would be coupled to the vehicle's ignition circuit, so that the vehicle may be disabled by dash unit 12 upon triggering of the silent alarm, or alternatively, after the vehicle has traveled for a short distance or time, stranding the would-be thief In one operational mode, the system controller 30 in dash unit 12 obtains a vehicle position reading from GPS receiver 40, and uses this position reading to read digitally formatted city street maps and/or tourist guide information from a CD-ROM installed into dash unit 12, and combines the street maps or tourist guide information with the vehicle position on display 14 to produce a useful navigational information for the vehicle occupants. This navigation information may include a street map 50 showing the location 52 of the vehicle as well as the location 54 of a landmark of interest. For convenience the vehicle operator should be able to zoom in or out on the street map grid on display 14 to view progress to the destination.

In a second operational mode, the vehicle occupants may use the handset keypad and/or the dash unit keypad 26 to identify a vehicle destination, e.g., a street name, street address, or landmark. The name of the destination may be partially identified by keys, and in response system controller 30 will search a compact disc in CD/CD-ROM player 32 to identify all destinations identified by the compact disc matching the partially identified name, and allow the vehicle occupant to select the correct destination from the list. After the vehicle occupant has selected a destination, system controller 30 will generate a route to the desired destination, using information stored on the compact disc and/or route generating algorithms in system controller 30, and display the desired route and the location 54 of the desired destination on display 14. Multiple routes may be generated, including (a.) the most direct route, (b.) the fastest route or (c.) a scenic route, for use when touring. The vehicle occupant can reject a route if known traffic conditions or other concerns make another alternative desirable. Alternatively, if broadcasts of traffic conditions are made available, e.g. through AM/FM radio received by tuner 38, or via wireless telephone signals received by repeater 46, system controller 30 may obtain this information and modify or plan routes based on prevailing traffic conditions.

In a third mode, system controller 30 may read digitally-encoded information on a compact disc in CD/CD-ROM player 32 to guide the vehicle through a tour of landmarks or tourist sites of a location. System controller 30 can use the vehicle position information from GPS receiver 40 to confirm the vehicle is following the tour route and to announce upcoming landmarks, turns or changes in direction.

Announcements of turns, landmark or tourist site information, and other data, may be displayed as text on display screen 14, or may be recorded and digitized for playback from a compact disc ROM via digital to analog converter 34, or both. As a third alternative, system controller 30 may also include a voice synthesizer for producing a digitized, synthesized voiced announcement of information of interest, for playback via digital to analog converter 34. Thus, when approaching a turn along a planned route, first an audible warning will be given of the approaching turn, followed by a visual "turn signal" warning on one display screen 14 and/or display screen 28.

Compact disc ROM's suitable for navigation and guided tours can be generated for each of the major cities of interest where the invention will be used. Alternatively, or in addition, information for display or use by system controller 30 can be obtained from on-line sources via the Internet, as obtained through wireless telephone connections made by system controller 30 and/or handset 24.

Referring now to FIGS. 3A and 3B, details of the handset 24 can be discussed in greater detail. Located on the surface of handset 24, is a keypad of buttons for controlling handset 24 and for generating infrared signals for controlling dash unit 12. A numeric section 62 of the keypad (FIG. 3A) includes keys typically used in controlling telephone operations, including the number 0–9, as well as the * and # symbols. Above the numeric section 62 are three control keys for controlling operations of the telephone, including a MUTE key for disabling the microphone, a PWR key for turning the telephone functions on and off, and a 911 key for initiating an emergency call. An alphabetic section 64 of the keypad (FIG. 3B) includes keys for each letter A–Z, as well as a SPACE key for entering a space, and control keys such as SRCH for initiating a search, CH RT for requesting a change of routing, HELP for requesting help, PSWD for entering a password and ENTER for entering a search request.

Handset 24 includes a sliding panel 60 which can be moved between a "telephone" position, shown in FIG. 3A, to a "remote control" position shown in FIG. 3B. In the "telephone" position, the numeric section 62 of the keypad is accessible, and the handset 24 can be used as a telephone. In the "remote control" position shown in FIG. 3B, the alphabetic section 64 of the keypad is accessible, and the handset 24 can be used as a remote control for the dash unit 12.

Adjacent a top end of the handset 24 is antenna 25, as well as the infrared transmitter 66 for transmitting infrared signals to the dash unit 12. Transmitter 66 and receiver 22 in dash unit 12 may, for example, incorporate the circuitry and functions described in U.S. Pat. No. 5,319,487, assigned to the same assignee as the present application, and incorporated herein in its entirety.

Handset 24 further includes an earpiece 68 and microphone 70 for generating and receiving audio to permit the use of handset 24 as a wireless telephone. Microphone 70 is positioned on a hinged lower section 72 which can be pivoted on hinge 74 over the alphabetic section of keypad 64 to reduce the overall length of handset 24.

Referring now to FIG. 4, the electronic circuitry within handset 24 can be described in greater detail. The heart of this circuitry is a handset controller 80, which may be a microprocessor, microcontroller, or ASIC. Controller 80 is responsive to the keypad 62,64, and controls the infrared transmitter 66 to generate infrared control signals for transmission to the dash unit. Controller 80 also controls operation of an analog audio circuit 82, which is connected to speaker 68 to produce audible sounds for the user and connected to microphone 70 to receive spoken sounds from the user. Controller 80 and audio circuit are both connected to a wireless telephone transmitter/receiver 84, which controls the transmission and reception of wireless telephone signals to and from antenna 25. Wireless telephone transmitter/receiver may, for example, incorporate the circuitry and functions described in U.S. Pat. No. 5,228,074, assigned to the same assignee as the present application, and incorporated herein in its entirety.

Handset 24 also includes a data and facsimile input/output circuit 86, for delivering and receiving digital data to and from transmitter/receiver 84 from and to the modular jack or I/O connector 27 of the handset 24, thus facilitating use of the handset 24 as a facsimile or data transmission line.

As can be seen from the foregoing, the present invention provides an integrated unit satisfying the needs for in-vehicle entertainment, navigational aid and communications, as well as vehicle security, in a compact, complete package easily adaptable to existing automobile sound systems. While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art.

For example, the dash unit might incorporate, instead of or in addition to the CD/CD-ROM player described above, a DVD player, mini-disc player, removable hard disk, or other digital data media player.

Handset 24 may communicate with dash unit 12 via radio frequency communication rather than infrared wireless communication, e.g., via the wireless telephone transmitter/receiver in the handset 12 and the wireless telephone repeater in the dash unit. Alternatively, handset 24 may communicate with dash unit 12 over a wired connection to dash unit 12, rather than a wireless connection. In the latter case, dash unit 12 may incorporate the wireless telephone transmitter/receiver, for transmitting and receiving wireless telephone signals to be forwarded to the handset 24 over the wired connection.

The invention in its broader aspects is therefore not limited to the specific details representative apparatus and method, and illustrative example shown and described. Accordingly, departures may be made from such details without departing from the spirit or scope of applicant's general inventive concept.

What is claimed is:

1. An electronic circuit for a vehicle, comprising:
   a global positioning system receiver for receiving radio frequency signals and generating therefrom a vehicle position,
   a screen for displaying information to a vehicle occupant,
   a digital data media player for reading position-related navigational information from removable digital data media, wherein the position-related navigational information includes safety and security information related to a position, and
   a system controller for obtaining a position generated using the global positioning system receiver, obtaining position-related navigation information from the digital data media player which is related to the vehicle position generated using the global positioning system receiver, and delivering the navigational information to the screen for display.

2. The electronic circuit of claim 1, wherein the digital data media player is a compact disc player.

3. The electronic circuit of claim 1, wherein the digital data media player is a DVD player.

4. The electronic circuit of claim 1, wherein the digital data media player is a mini-disc player.

5. The electronic circuit of claim 1, wherein the digital data media player is a removable hard disk drive player.

6. The electronic circuit of claim 1, wherein the position-related navigational information includes maps of streets near to a position.

7. The electronic circuit of claim 1, wherein the position-related navigational information includes landmarks near to a position.

8. The electronic circuit of claim 1, wherein the position-related navigational information includes tourist information related to a position.

9. The electronic circuit of claim 1, wherein the system controller is responsive to alphanumeric input from an alphanumeric keypad.

10. The electronic circuit of claim 9, wherein the system controller is responsive to alphanumeric input from the keypad to search and locate position-related navigational information using the digital data media player.

11. The electronic circuit of claim 9, wherein the system controller plots routes along streets and roads identified using the digital data media player, to a location identified by a vehicle occupant via the alphanumeric keypad.

12. The electronic circuit of claim 9 wherein the system controller performs a security function, such that a password or code must be entered into the keypad to permit continued operation of the system controller.

13. The electronic circuit of claim 9, wherein the system controller is located within a dashboard-mountable housing, and the alphanumeric keypad is located on a handset that may be positioned remote from the dashboard-mountable housing.

14. The electronic circuit of claim 13 wherein the handset includes a transmitter generating infrared control signals in response to actuation of the keypad, and the system controller includes a receiver receiving the infrared control signals and controlling operations of the system controller in response thereto.

15. The electronic circuit of claim 13 further comprising a wired connection between the handset and the system controller.

16. The electronic circuit of claim 13 wherein the handset further comprises a microphone and earpiece to permit use of the handset as a telephone for transmitting and receiving wireless radio telephone communications.

17. The electronic circuit of claim 16 wherein the alphanumeric keypad includes a numeric keypad for controlling the system controller as well as wireless radio telephone communications, and an alphabetic keypad for entering alphabetic characters to control at least the system controller.

18. The electronic circuit of claim 16 further comprising a wired connection between the handset and the system controller, wherein the system controller further comprises a wireless telephone transmitter/receiver and an antenna connected to the wireless telephone transmitter/receiver for transmitting and receiving wireless telephone signals.

19. The electronic circuit of claim 16 wherein the handset further comprises a wireless telephone transmitter/receiver and an antenna connected to the wireless telephone transmitter/receiver for transmitting and receiving wireless telephone signals.

20. The electronic circuit of claim 19 wherein the system controller further comprises a wireless telephone signal repeater for receiving and amplifying radio frequency signals generated using the wireless telephone transmitter/receiver in the handset.

21. The electronic circuit of claim 1 further comprising a second screen connected to said system controller, said system controller causing said second screen to display status information regarding the operation of the system controller.

22. The electronic circuit of claim 1 further comprising an amplifier delivering an amplified analog signal to one or more vehicle speakers.

23. The electronic circuit of claim 22 further comprising a radio tuner for receiving radio broadcasts of music or other audio, the radio tuner connected to the amplifier to deliver the music or other audio to the amplifier.

24. The electronic circuit of claim 23, further comprising a digital to analog converter converting digitally-encoded audio information into an analog signal and delivering the analog signal to the amplifier for output by the one or more speakers as an audible signal, wherein the digital data media player is capable of reading digitized music or audio from digital data media, and the system controller delivers digitized music or audio to the digital to analog converter.

25. An electronic circuit for a vehicle, comprising:
a dashboard unit comprising a global positioning system receiver for receiving radio frequency signals and generating therefrom a vehicle position and a system controller controlling operations of the global positioning system receiver, and
a handset that may be positioned remote from the dashboard unit incorporating a remote control circuit for controlling operation of the system controller, the handset comprising a microphone and earpiece usable as a telephone for transmitting and receiving wireless radio telephone communications.

26. The electronic circuit of claim 25, wherein the handset further comprises an alphanumeric keypad.

27. The electronic circuit of claim 26 wherein the alphanumeric keypad includes a numeric keypad for controlling the global positioning system receiver via the system controller as well as wireless radio telephone communications, and an alphabetic keypad for entering alphabetic characters to control at least the global positioning system receiver via the system controller.

28. The electronic circuit of claim 25 wherein the handset further comprises a wireless telephone transmitter/receiver and an antenna connected to the wireless telephone transmitter/receiver for transmitting and receiving wireless telephone signals.

29. The electronic circuit of claim 28 wherein the system controller further comprises a wireless telephone signal repeater for receiving and amplifying radio frequency signals generated using the wireless telephone transmitter/receiver in the handset.

30. The electronic circuit of claim 25 further comprising a wired connection between the handset and the system controller, wherein the system controller further comprises a wireless telephone transmitter/receiver and an antenna connected to the wireless telephone transmitter/receiver for transmitting and receiving wireless telephone signals.

31. The electronic circuit of claim 25 wherein the handset further comprises a keypad, and a transmitter generating infrared control signals in response to actuation of the keypad, and wherein the system controller further comprises a receiver receiving the infrared control signals and controlling operations of the system controller in response thereto.

32. The electronic circuit of claim 25 further comprising a wired connection between the handset and the system controller.

33. An electronic circuit for a vehicle, comprising:
a dashboard unit comprising a digital data media player and a system controller controlling the digital data media player to deliver digital information to an occupant of the vehicle, and
a handset that may be positioned remote from the dashboard unit incorporating a remote control circuit for controlling operation of the system controller, the handset comprising a microphone and earpiece usable as a telephone for transmitting and receiving wireless radio telephone communications.

34. The electronic circuit of claim 33, wherein the handset further comprises an alphanumeric keypad.

35. The electronic circuit of claim 34 wherein the alphanumeric keypad includes a numeric keypad for controlling the digital data media player via the system controller as well as wireless radio telephone communications, and an alphabetic keypad for entering alphabetic characters to control at least the digital data media player via the system controller.

36. The electronic circuit of claim 33 wherein the handset further comprises a wireless telephone transmitter/receiver and an antenna connected to the wireless telephone transmitter/receiver for transmitting and receiving wireless telephone signals.

37. The electronic circuit of claim 36 wherein the system controller further comprises a wireless telephone signal repeater for receiving and amplifying radio frequency signals generated using the wireless telephone transmitter/receiver in the handset.

38. The electronic circuit of claim 33 further comprising a wired connection between the handset and the system controller, wherein the system controller further comprises a wireless telephone transmitter/receiver and an antenna connected to the wireless telephone transmitter/receiver for transmitting and receiving wireless telephone signals.

39. The electronic circuit of claim 33 wherein the handset further comprises a keypad, and a transmitter generating infrared control signals in response to actuation of the keypad, and wherein the system controller further comprises a receiver receiving the infrared control signals and controlling operations of the system controller in response thereto.

40. The electronic circuit of claim 33 further comprising a wired connection between the handset and the system controller.

41. An electronic circuit for a vehicle, comprising:
a global positioning system receiver for receiving radio frequency signals and generating therefrom a vehicle position,
a screen for displaying information to a vehicle occupant,
a system controller for obtaining a position generated using the global positioning system receiver, and delivering navigational information to the screen for display, and performing a security function, such that a password or code must be entered into system controller to permit continued operation of the system controller.

42. The electronic circuit of claim 41 further comprising:
a digital storage device storing position-related navigational information,
wherein said system controller obtains position-related navigation information using the digital storage device which is related to the vehicle position generated using the global positioning system receiver, and delivers said navigation information to the screen for display.

43. The electronic circuit of claim 42, wherein the position-related navigational information includes tourist information related to a position.

44. The electronic circuit of claim 42, wherein the position-related navigational information includes maps of streets near to a position.

45. The electronic circuit of claim 42, wherein the position-related navigational information includes landmarks near to a position.

46. The electronic circuit of claim 42, wherein the digital storage device is a digital data media player.

47. The electronic circuit of claim 46, wherein the digital data media player is a compact disc player.

48. The electronic circuit of claim 46, wherein the digital data media player is a DVD player.

49. The electronic circuit of claim 46, wherein the digital data media player is a mini-disc player.

50. The electronic circuit of claim 46, wherein the digital data media player is a removable hard disk drive player.

51. The electronic circuit of claim 42, wherein the system controller is responsive to alphanumeric input from an alphanumeric keypad.

52. The electronic circuit of claim 51, wherein the system controller is responsive to alphanumeric input from the keypad to search and locate position-related navigational information using the digital data media player.

53. The electronic circuit of claim 51, wherein the system controller plots routes along streets and roads identified using the digital data media player, to a location identified by a vehicle occupant via the alphanumeric keypad.

54. The electronic circuit of claim 51, wherein the system controller is located within a dashboard-mountable housing, and the alphanumeric keypad is located on a handset that may be positioned remote from the dashboard-mountable housing.

55. The electronic circuit of claim 54 further comprising a wired connection between the handset and the system controller.

56. The electronic circuit of claim 54 wherein the handset includes a transmitter generating infrared control signals in response to actuation of the keypad, and the system controller includes a receiver receiving the infrared control signals and controlling operations of the system controller in response thereto.

57. The electronic circuit of claim 54 wherein the handset further comprises a microphone and earpiece to permit use of the handset as a telephone for transmitting and receiving wireless radio telephone communications.

58. The electronic circuit of claim 57 further comprising a wired connection between the handset and the system controller, wherein the system controller further comprises a wireless telephone transmitter/receiver and an antenna connected to the wireless telephone transmitter/receiver for transmitting and receiving wireless telephone signals.

59. The electronic circuit of claim 57 wherein the alphanumeric keypad includes a numeric keypad for controlling the system controller as well as wireless radio telephone communications, and an alphabetic keypad for entering alphabetic characters to control at least the system controller.

60. The electronic circuit of claim 57 wherein the handset further comprises a wireless telephone transmitter/receiver and an antenna connected to the wireless telephone transmitter/receiver for transmitting and receiving wireless telephone signals.

61. The electronic circuit of claim 60 wherein the system controller further comprises a wireless telephone signal repeater for receiving and amplifying radio frequency signals generated using the wireless telephone transmitter/receiver in the handset.

62. The electronic circuit of claim 41 further comprising a second screen connected to said system controller, said system controller causing said second screen to display status information regarding the operation of the system controller.

63. The electronic circuit of claim 41 further comprising an amplifier delivering an amplified analog signal to one or more vehicle speakers.

64. The electronic circuit of claim 63 further comprising a radio tuner for receiving radio broadcasts of music or other audio, the radio tuner connected to the amplifier to deliver the music or other audio to the amplifier.

65. The electronic circuit of claim 63, further comprising a digital to analog converter converting digitally-encoded audio information into an analog signal and delivering the analog signal to the amplifier for output by the one or more speakers as an audible signal, wherein the digital data media player is capable of reading digitized music or audio from digital data media, and the system controller delivers digitized music or audio to the digital to analog converter.

66. An electronic circuit for a vehicle, comprising:
a global positioning system receiver for receiving radio frequency signals and generating therefrom a vehicle position,
first and second physically separable screens for displaying information to a vehicle occupant,
a system controller for obtaining a position generated using the global positioning system receiver, and delivering navigational information to the first and/or second screen for display.

67. The electronic circuit of claim 66 further comprising:
a digital storage device storing position-related navigational information,
wherein said system controller obtains position-related navigation information from the digital storage device which is related to the vehicle position generated using the global positioning system receiver, and delivers said navigation information to the first and/or second screen for display.

68. The electronic circuit of claim 67, wherein the digital storage device is a digital data media player.

69. The electronic circuit of claim 68, wherein the digital data media player is a compact disc player.

70. The electronic circuit of claim 68, wherein the digital data media player is a DVD player.

71. The electronic circuit of claim 68, wherein the digital data media player is a mini-disc player.

72. The electronic circuit of claim 68, wherein the digital data media player is a removable hard disk drive player.

73. The electronic circuit of claim 67, wherein the position-related navigational information includes maps of streets near to a position.

74. The electronic circuit of claim 67, wherein the position-related navigational information includes landmarks near to a position.

75. The electronic circuit of claim 67, wherein the position-related navigational information includes tourist information related to a position.

76. The electronic circuit of claim 67, wherein the system controller is responsive to alphanumeric input from an alphanumeric keypad.

77. The electronic circuit of claim 76, wherein the system controller is responsive to alphanumeric input from the keypad to search and locate position-related navigational information using the digital storage device.

78. An electronic circuit for a vehicle, comprising:
a global positioning system receiver for receiving radio frequency signals and generating therefrom a vehicle position,
first and second screen areas for displaying information to a vehicle occupant,
a digital storage device storing position-related navigational-information,
a system controller for obtaining a position generated using the global positioning system receiver, and delivering navigational information to the first and/or second screen areas for display, said system controller obtaining position-related navigation information from the digital storage device which is related to the vehicle position generated using the global positioning system receiver, and delivers said navigation information to the first and/or second screen areas for display,
a keypad connected to said system controller for delivering input to said system controller,
wherein the system controller plots routes along streets and roads identified by using the digital storage device, to a location identified by a vehicle occupant via the alphanumeric keypad.

79. An electronic circuit for a vehicle, comprising:
a global positioning system receiver for receiving radio frequency signals and generating therefrom a vehicle position,
first and second screen areas for displaying information to a vehicle occupant,
a system controller for obtaining a position generated using the global positioning system receiver, and delivering navigational information to the first and/or second screen areas for display,
a keypad connected to said system controller for delivering input to said system controller,
wherein the system controller is located within a dashboard-mountable housing, and the keypad is located on a handset that may be positioned remote from the dashboard-mountable housing.

80. The electronic circuit of claim 79 wherein the handset further comprises a microphone and earpiece to permit use of the handset as a telephone for transmitting and receiving wireless radio telephone communications.

81. The electronic circuit of claim 80 further comprising a wired connection between the handset and the system controller, wherein the system controller further comprises a wireless telephone transmitter/receiver and an antenna connected to the wireless telephone transmitter/receiver for transmitting and receiving wireless telephone signals.

82. The electronic circuit of claim 80 wherein the handset further comprises a wireless telephone transmitter/receiver and an antenna connected to the wireless telephone transmitter/receiver for transmitting and receiving wireless telephone signals.

83. The electronic circuit of claim 82 wherein the system controller further comprises a wireless telephone signal repeater for receiving and amplifying radio frequency signals generated using the wireless telephone transmitter/receiver in the handset.

84. The electronic circuit of claim 80 wherein the alphanumeric keypad includes a numeric keypad for controlling the system controller as well as wireless radio telephone communications, and an alphabetic keypad for entering alphabetic characters to control at least the system controller.

85. The electronic circuit of claim 79 wherein the handset includes a transmitter generating infrared control signals in response to actuation of the keypad, and the system controller includes a receiver receiving the infrared control signals and controlling operations of the system controller in response thereto.

86. The electronic circuit of claim 79 further comprising a wired connection between the handset and the system controller.

87. An electronic circuit for a vehicle, comprising:
a global positioning system receiver for receiving radio frequency signals and generating therefrom a vehicle position,
first and second screen areas for displaying information to a vehicle occupant,
a system controller for obtaining a position generated using the global positioning system receiver, and delivering navigational information to the first and/or second screen areas for display, and
an amplifier controlled by said system controller and delivering an amplified analog signal to one or more vehicle speakers.

88. The electronic circuit of claim 87 further comprising a radio tuner for receiving radio broadcasts of music or other audio, the radio tuner connected to the amplifier to deliver the music or other audio to the amplifier.

89. The electronic circuit of claim 87, further comprising a digital storage device and a digital to analog converter converting digitally-encoded audio information into an analog signal and delivering the analog signal to the amplifier for output by the one or more speakers as an audible signal, wherein the digital storage device is capable of reading digitized music or audio from digital data media, and the system controller delivers digitized music or audio to the digital to analog converter.

90. An electronic circuit for a vehicle, comprising:
   a global positioning system receiver for receiving radio frequency signals and generating therefrom a vehicle position,
   a screen for displaying information to a vehicle occupant,
   a digital data media player for reading position-related navigational information from removable digital data media,
   a system controller for obtaining a position generated using the global positioning system receiver, obtaining position-related navigation information using the digital data media player which is related to the vehicle position generated using the global positioning system receiver, and delivering the navigational information to the screen for display,
   an amplifier delivering an amplified analog signal to one or more vehicle speakers, and
   a digital to analog converter converting digitally-encoded audio information into an analog signal and delivering the analog signal to the amplifier for output by the one or more speakers as an audible signal, wherein the digital data media player is capable of reading digitized music or audio from digital data media, and the system controller delivers digitized music or audio to the digital to analog converter.

91. The electronic circuit of claim 90, wherein the digital data media player is a compact disc player.

92. The electronic circuit of claim 90, wherein the digital data media player is a DVD player.

93. The electronic circuit of claim 90, wherein the digital data media player is a mini-disc player.

94. The electronic circuit of claim 90, wherein the digital data media player is a removable hard disk drive player.

95. The electronic circuit of claim 90, wherein the position-related navigational information includes maps of streets near to a position.

96. The electronic circuit of claim 90, wherein the position-related navigational information includes landmarks near to a position.

97. The electronic circuit of claim 90, wherein the position-related navigational information includes tourist information related to a position.

98. The electronic circuit of claim 90, wherein the system controller is responsive to alphanumeric input from an alphanumeric keypad.

99. The electronic circuit of claim 98, wherein the system controller is responsive to alphanumeric input from the keypad to search and locate position-related navigational information using the digital data media player.

100. The electronic circuit of claim 98, wherein the system controller plots routes along streets and roads identified using the digital data media player, to a location identified by a vehicle occupant via the alphanumeric keypad.

101. The electronic circuit of claim 98, wherein the system controller is located within a dashboard-mountable housing, and the alphanumeric keypad is located on a handset that may be positioned remote from the dashboard-mountable housing.

102. The electronic circuit of claim 101 further comprising a wired connection between the handset and the system controller.

103. The electronic circuit of claim 101 wherein the handset includes a transmitter generating infrared control signals in response to actuation of the keypad, and the system controller includes a receiver receiving the infrared control signals and controlling operations of the system controller in response thereto.

104. The electronic circuit of claim 101 wherein the handset further comprises a microphone and earpiece to permit use of the handset as a telephone for transmitting and receiving wireless radio telephone communications.

105. The electronic circuit of claim 104 wherein the handset further comprises a wireless telephone transmitter/receiver and an antenna connected to the wireless telephone transmitter/receiver for transmitting and receiving wireless telephone signals.

106. The electronic circuit of claim 105 wherein the system controller further comprises a wireless telephone signal repeater for receiving and amplifying radio frequency signals generated using the wireless telephone transmitter/receiver in the handset.

107. The electronic circuit of claim 104 wherein the alphanumeric keypad includes a numeric keypad for controlling the system controller as well as wireless radio telephone communications, and an alphabetic keypad for entering alphabetic characters to control at least the system controller.

108. The electronic circuit of claim 104 further comprising a wired connection between the handset and the system controller, wherein the system controller further comprises a wireless telephone transmitter/receiver and an antenna connected to the wireless telephone transmitter/receiver for transmitting and receiving wireless telephone signals.

109. The electronic circuit of claim 90 further comprising a radio tuner for receiving radio broadcasts of music or other audio, the radio tuner connected to the amplifier to deliver the music or other audio to the amplifier.

* * * * *